Aug. 11, 1925.

T. H. COX 1,549,455

VEHICLE SPRING

Filed Feb. 16, 1923

INVENTOR:

THOMAS H. COX,

By: Otto H. Krueger,
his Atty.

Patented Aug. 11, 1925.

1,549,455

UNITED STATES PATENT OFFICE.

THOMAS H. COX, OF LOS ANGELES, CALIFORNIA.

VEHICLE SPRING.

Application filed February 16, 1923. Serial No. 619,428.

*To all whom it may concern:*

Be it known that I, THOMAS H. COX, a citizen of the United States, residing at Los Angeles, in the county of Los Angeles and State of California, have invented a new and useful Vehicle Spring, of which the following is a specification.

This invention relates to devices used for yieldingly supporting the body of a vehicle on the axles.

One of the objects of this invention is to provide a spring in which the principal leaves are nearly of the same length, but, in their uncompressed positions, are spaced one from another at the terminations.

Another object is to provide a spring which by the distinct shape and arrangement of its leaves produces the effect of a spring of greater length.

Another object is to provide a spring in which the several leaves come into action one after the other, and, therefore, in reversed action, tend to eliminate or diminish an undesirable rebounding.

Another object is to impart resiliency with strength to a spring.

Another object is to provide a spring in which resiliency is increased with added strength.

Other objects will appear from the following description and appended claims as well as from the accompanying drawing, in which—

In common vehicle springs, the several leaves are normally made one shorter than the other, all being held together in such a manner as to apply a load directly to all leaves, which practically results in an undesirable rebounding.

The resiliency of a spring, designed in this common manner, is diminished with each leaf added to the spring.

One of the main objects of this invention is to maintain a suitable resiliency regardless of the number of leaves used in a spring, and to design and arrange the several leaves of the spring so as to eliminate or diminish a rebounding.

Figure 1:
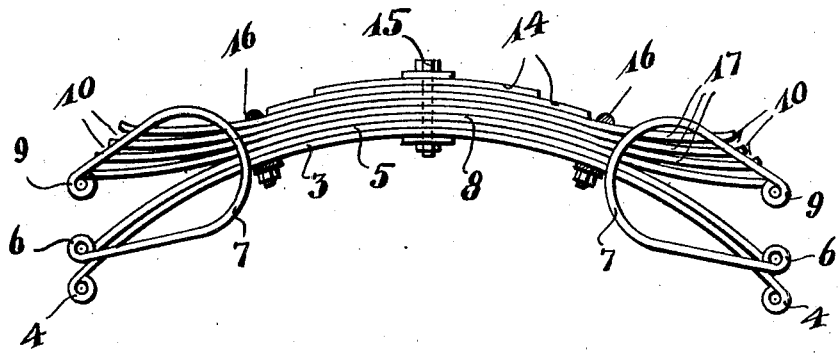
Fig. 1 is a side elevation of a spring embodying my invention.

In Fig. 1, leaf 3 is provided with knuckle-ends 4, to be connected to parts of a vehicle. A second leaf 5, being placed adjacent to the spring-leaf 3, is also provided with knuckle-ends, as indicated at 6, for supporting intermediate springs or members 7. A third spring-leaf 8 is provided with knuckle-ends 9.

The leaves 5 and 8 are preferably spaced at their terminations, so that the intermediate springs 7 form the only supporting means for the ends of the spring 8 in relation to the spring-ends of the leaf 5.

Considering that any number of spring-leaves may be disposed in place of the leaves 3 and 5, depending on the weight or load to be carried by the spring-structure as a whole, this number, or group, or set of spring-leaves may be said to have a certain suspension or supporting length.

In place of, or in combination with the leaf 8, another number of spring-leaves can be used to form a second group or set of spring-leaves, depending on the weight or load to be carried by the spring-structure as a whole, which may be said to have a suspension or supporting length similar to the first group.

Connecting the two groups of spring-leaves by the intermediate spring-members 7 tends to impart the whole combination with a suspension practically double that of a normally built spring with a similar number of spring-leaves.

The several leaves in the groups of spring-members are preferably spaced at their terminations as clearly illustrated at 10, to bring one spring-leaf after the other into action, and to relieve one leaf after the other in the reversed action of the load carried by the whole combination, to eliminate or diminish a rebounding.

Figure 2:
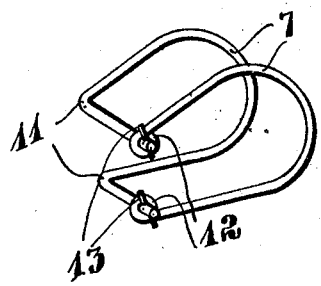
Fig. 2 is a perspective illustration of a pair of intermediate spring members.

A simple form for connecting the intermediate springs is illustrated in Fig. 2. The one member is bent as indicated at 11, while the other member is provided with knuckle or loop-ends as indicated at 12. The loop-ends 12 are disposed over the ends or terminations of the bent member, held in place by pins 13.

In addition to the above-described leaves, two shorter spring-leaves 14 are illustrated in Fig. 1, being one shorter than the other and both firmly resting one on the other spring-leaves in the usual manner. A bolt 15 is illustrated of a type as commonly used for holding the whole spring-structure together. Clips 16 also are of the common type for holding the several spring-leaves together.

The spring-leaves 17 are illustrated slightly spaced, as indicated at 10, so that one after the other of these leaves comes into action in connection with the leaf 8. The leaf 8 and the leaves 17 are nearly of the same length. The combination of the leaves 8 and 17 may be said to form one group of co-acting spring-leaves with a certain suspension. The leaves 3 and 5 may be said to form another group of co-acting spring-leaves with a certain suspension similar to the suspension of the other group. After the group 5—3 becomes compressed by a load to a suitable extent, the pressure is transmitted through the intermediate spring members 7 to the other group 8—17.

While in common spring-structures, all the several leaves are formed to closely rest one against the other, thereby receiving the load or weight directly, resulting in a direct and forceful recoiling of all leaves; in this structure, a load or weight acts on one leaf after the other, and the leaves are also relieved one after the other, besides having the two-fold group action.

Having thus described my invention, I claim:

1. In a spring-structure, distinct groups of spring-leaves, the whole being rigidly connected in the middle, the terminations of the several leaves in each group being curved in opposite directions so as to leave a distinct space between the two adjacent leaves of the oppositely curved groups, the terminations of the leaves in one group being curved gradually one more than the other to form distinct spaces between the terminations in this group, the two adjacent leaves of the oppositely curved groups being interconnected by independent spring-members.

2. In a spring-structure, distinct groups of spring-leaves rigidly interconnected at the middle into a half-elliptic spring-structure the spring-leaves in one group following the normal contours of the half-elliptic springs throughout their length, the spring-leaves in the other group being curved back from the middle interconnected portion so as to leave distinct spaces between the two adjacent leaves of the thus oppositely curved groups, the terminations of the group with the thus rearwardly curved leaves being gradually curved one more than the other so as to leave distinct spaces between the several terminations in this group, the two adjacent leaves of the oppositely curved groups being interconnected by independent spring-members.

In testimony that I claim the foregoing as my invention I have signed my name in the presence of two subscribing witnesses.

THOMAS H. COX.

Witnesses:
O. H. KRUEGER,
MARY A. LUTHER.